Aug. 29, 1950 — A. A. LOGMANN ET AL — 2,520,554
LADING STRAP ANCHOR FOR FREIGHT CARS
Filed Dec. 12, 1947 — 3 Sheets-Sheet 1
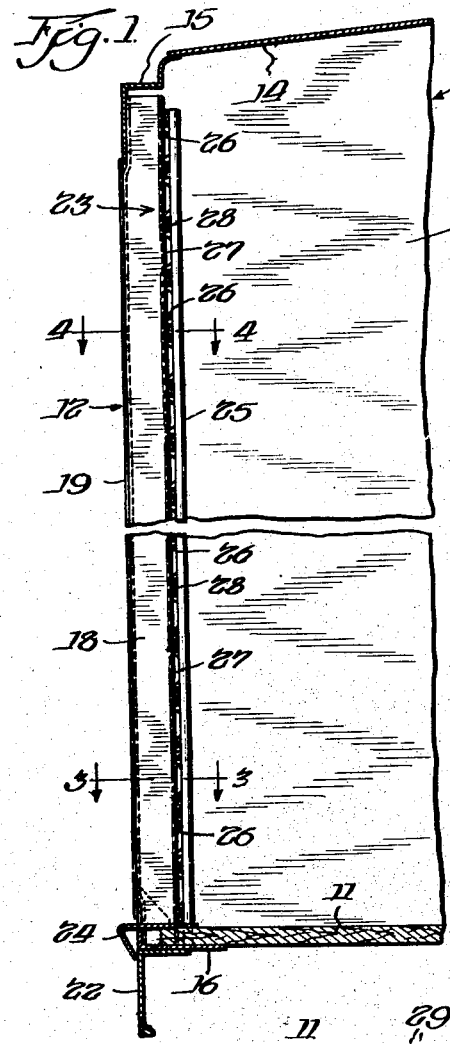
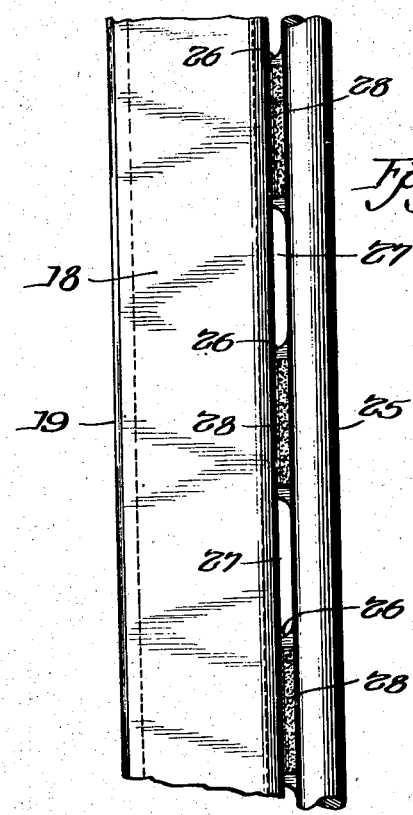
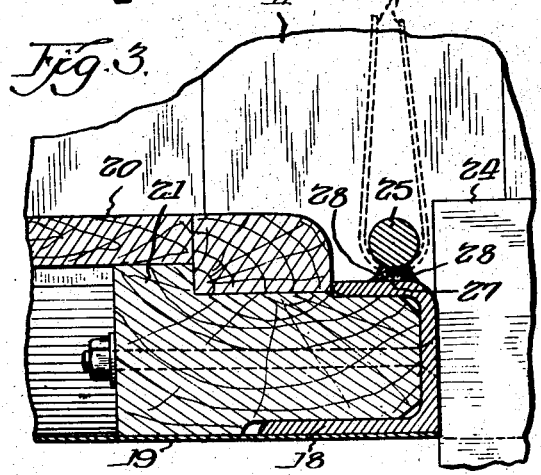
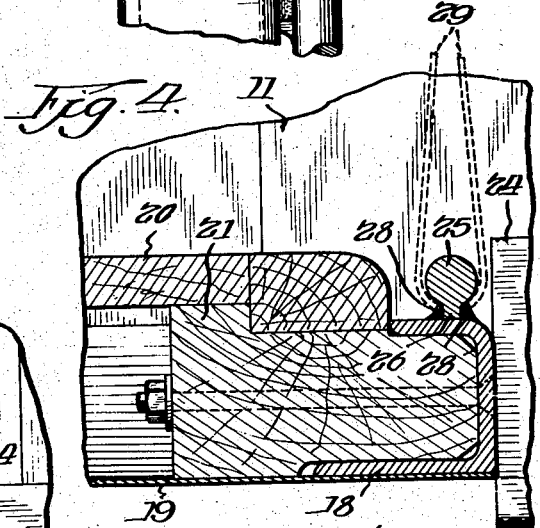
Inventors.
Arthur A. Logmann, &
George C. Meyers.
By Oscar Hochberg
Atty.

Aug. 29, 1950 A. A. LOGMANN ET AL 2,520,554
LADING STRAP ANCHOR FOR FREIGHT CARS
Filed Dec. 12, 1947 3 Sheets-Sheet 2
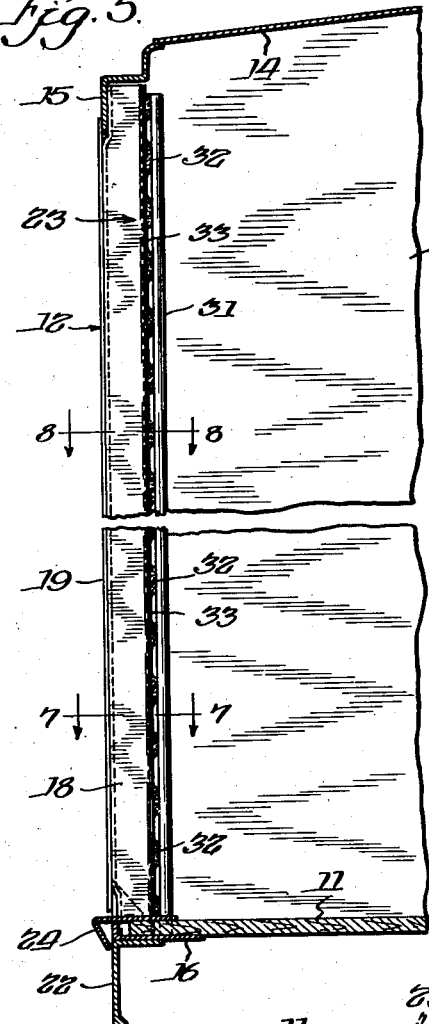
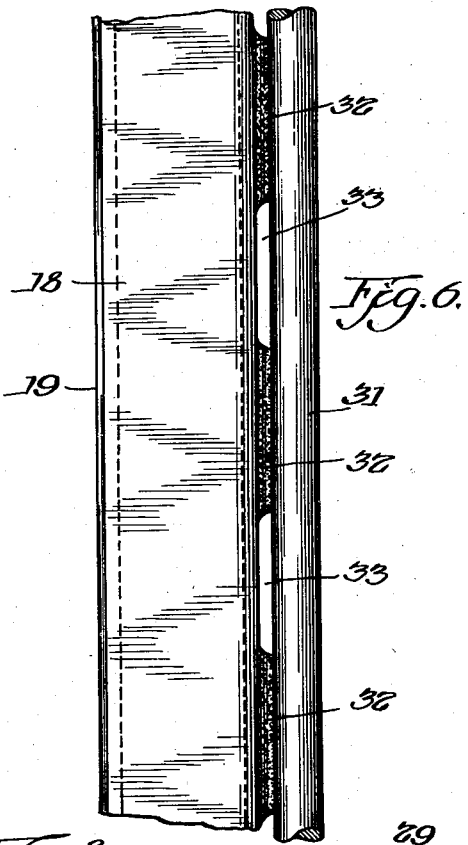
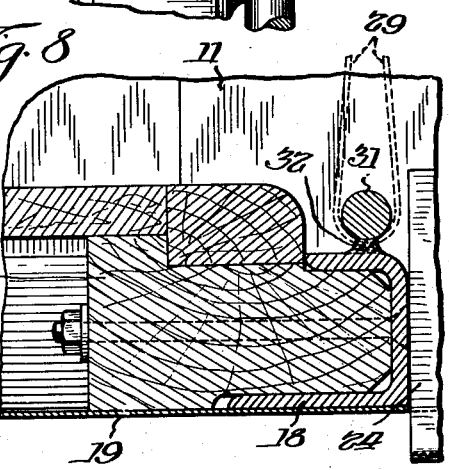
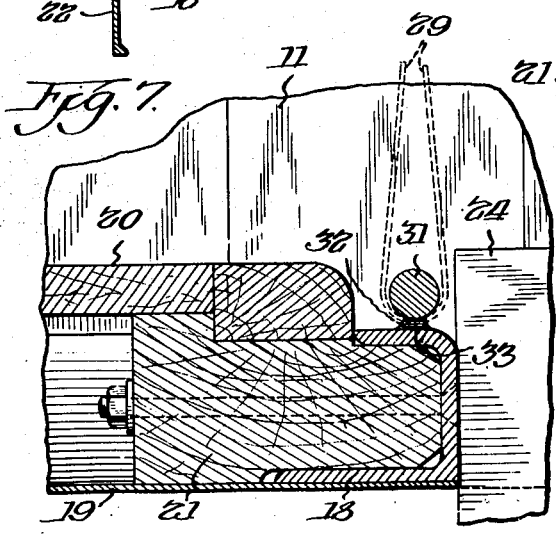
Inventors.
Arthur A. Logmann &
George C. Meyers.
By Oscar Hochberg
Atty.

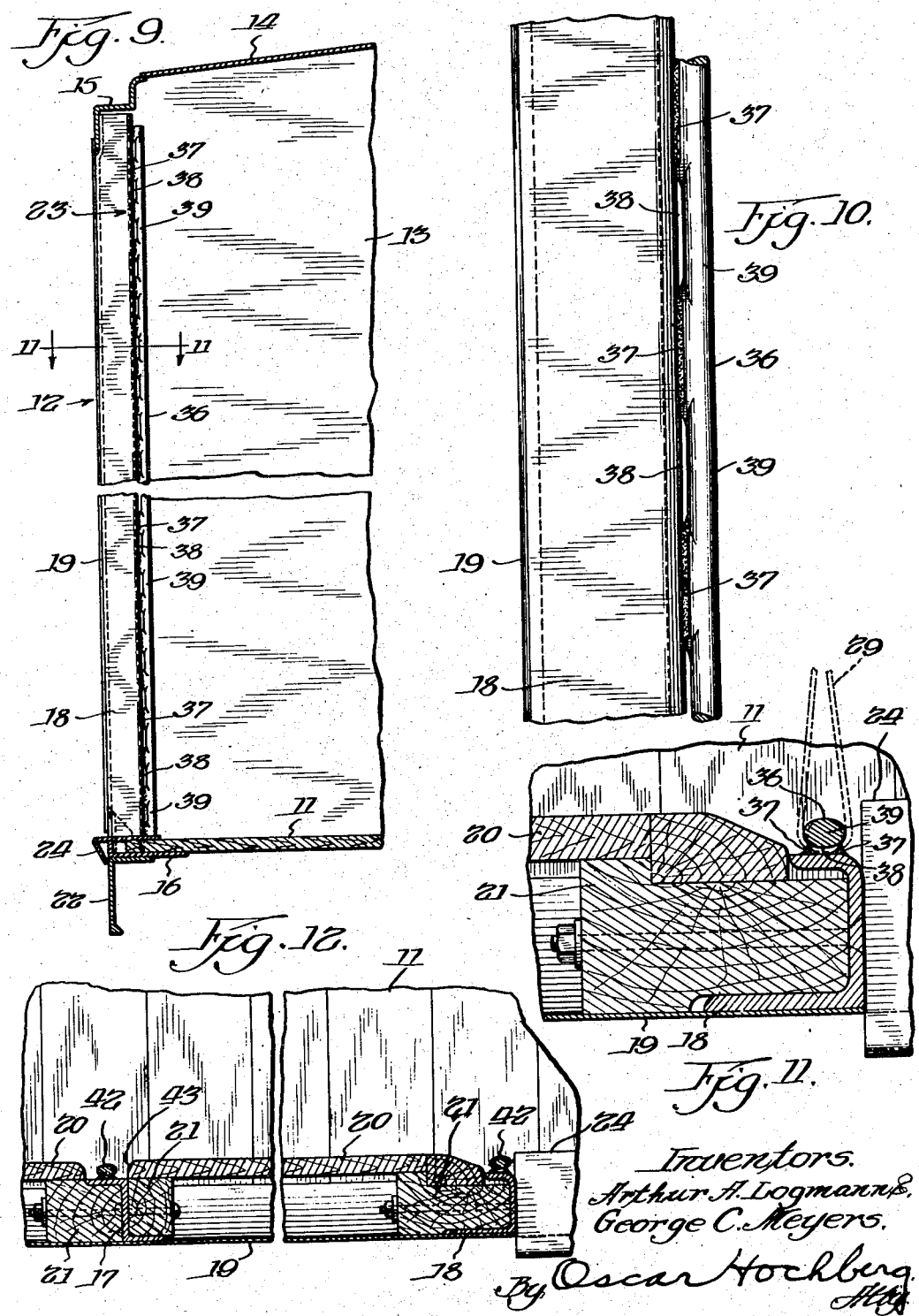

Patented Aug. 29, 1950

2,520,554

UNITED STATES PATENT OFFICE 2,520,554

LADING STRAP ANCHOR FOR FREIGHT CARS

Arthur A. Logmann and George C. Meyers, Michigan City, Ind., assignors to Pullman-Standard Car Manufacturing Company, Chicago, Ill., a corporation of Delaware Application December 12, 1947, Serial No. 791,346

19 Claims. (Cl. 105—369)

REISSUED
JUL 24 1951
RE23394

This invention relates generally to railway freight cars and has for its primary object the provision of means for securing lading in such cars.

The principal object of the invention includes the provision of permanently attached anchor members secured to vertical framing members of a freight car as an integrated part thereof.

An important object of the invention contemplates continuous vertical members secured to the framing members of a freight car and having openings therebetween at intervals for the removable attachment of lading straps.

Another and more specific object of the invention comprises a vertical anchor member secured at intervals to a framing member by welding, and spaced from the frame member between welds for the attachment of lading straps.

A further object of the invention proposes to utilize vertical lading strap anchor members for attachment to the framing members of a freight car by welding, and of such form or so shaped as to afford spaces between weldments for the passage of lading straps between the anchor members and framing members.

A still further object of the invention is to provide a lading strap anchor member for application to a box car side door post in a manner to serve the additional purpose of a door post protection member.

The foregoing and other objects of the invention are attained by the construction and arrangement illustrated in the accompanying drawings, in which Fig. 1 is a general transverse sectional view in the doorway of a typical box car, showing the attachment of a lading strap anchor member to a door post;

Fig. 2 is a fragmentary detail view to larger scale of a portion of the door post showing the attachment of the lading strap anchor by welding at spaced intervals through the medium of laterally projecting ears or tabs contained on the anchor member;

Fig. 3 is a horizontal sectional view through the door post taken on the line 3—3 of Fig. 1 showing the attachment thereto by welding of the lading strap anchor member, with the section being taken at the spaced portion of the anchor member and indicating the lading strap in broken lines;

Fig. 4 is a horizontal sectional view through the door post also, taken on the line 4—4 of Fig. 1, but with the section taken at the attaching portion of the anchor member, and showing the securing welds at opposite sides of a laterally projecting ear or tab member;

Fig. 5 is a general transverse sectional view through the doorway of a typical box car similar to Fig. 1, but illustrating a modified form of lading strap anchor member welded to the door post;

Fig. 6 is a fragmentary detail view to larger scale, similar to Fig. 2, illustrating a portion of the door post shown in Fig. 5, and showing the application of a straight vertical anchor member to the car door post by means of intermittent welds which space the member from the post for passage of lading straps between the welds;

Fig. 7 is a horizontal sectional view through the door post similar to Fig. 3 taken on the line 7—7 of Fig. 5 and showing the attachment of the anchor member to the post by spaced welds, with the lading strap indicated in broken lines as passing through the openings between the attachments of weld metal, the section being taken through one of the openings;

Fig. 8 also is a horizontal sectional view through the door post, similar to Fig. 4, taken on the line 8—8 of Fig. 5 through the attaching weld portion securing the anchor member to the post, and showing the dual purpose of the weld metal of securing the straight anchor member of the post and spacing it therefrom for passage of the lading straps between welds;

Fig. 9 again is a general tranverse sectional view through the doorway of a typical box car, similar to Figs. 1 and 5, but illustrating a further modification of the lading strap anchor showing the anchor member formed to provide alternately, portions contacting the door post and portions spaced therefrom for the passage of lading strap members, with the contacting portions welded to the post;

Fig. 10 is a fragmentary detail view to larger scale, similar to Figs. 2 and 6, illustrating a portion of the door post shown in Fig. 9 and showing the formation of the anchor member to provide portions spaced from the post to provide openings and portions bearing against the post for securement by welding;

Fig. 11 is a horizontal sectional view through the door post, similar to Figs. 3 and 7, taken on the line 11—11 of Fig. 9 and showing the shape of the anchor member to provide portions bearing against the door post and secured by welding with portions thereof between points of attachment spaced from the post to provide for passage of lading straps as indicated in broken lines, the section being taken at a spaced portion of the anchor member; and Fig. 12 is a horizontal sectional view through a portion of a side wall of a typical box car construction, showing the application of lading strap anchors to an intermediate framing post and to the door post.

In railway freight cars it is necessary frequently to brace and secure the lading at intervals throughout the length of a car to facilitate loading and unloading of L. C. L. shipments and properly to brace and secure particular items of freight in a shipment and in the general bracing and securement of a car load lot. It is to the anchorage of lading straps utilized for these purposes that this invention is directed, and has for an advantage that it affords a simple arrangement for the intended function, readily utilized in practice and forming an integrated part of the car framing structure, and in some instances serving to reinforce or protect certain of the framing members.

In the drawings, 10 represents a railway freight car which for purposes of illustration is shown as a box car having a floor 11, sidewall 12, end wall 13, and roof 14. The side wall 12 is comprised of a side plate 15, a side sill 16, vertical framing posts, including intermediate posts 17 and door posts 18 extending between and secured to the sill and side plate and presenting a flush outer surface therewith to which an outer sheathing 19 is secured by welding. An inside lining 20 is secured to the side wall through the medium of furring strips 21 fastened to the framing members. A sub-side sill 22 reinforces the sill 16 in the area of the side door opening 23, and a threshold plate 24, extending between door posts 18, protects the edge of the floor 11 in the door opening.

The lading strap anchor of the present invention is equally applicable to the intermediate framing posts 17 or to the posts 18 at respective sides of the door opening. In Figs. 1 through 4, one form of anchor member is illustrated as applied to a door post. The anchor member of this form comprises an integral section containing inherent means for spacing the main section from the framing post. The anchor member comprises a continous round section 25 disposed vertically and paralleling the framing post 18, and having laterally projecting ears or tabs 26 at vertically spaced intervals formed as an integral part thereof and extending from the body of the anchor section 25 of the post normally to space the main body of the section from the inner surface of the post and thereby affording openings 27 between the post and anchor, as best indicated in Figs. 1 and 2, and extending between the various connecting portions 26. The section 25 is secured to the post by means of weld metal 28 disposed at opposite sides of the respective connecting portions 26 to provide an integrated structure having openings extending between adjacent fastenings for the passage of lading straps. The multiplicity of openings 27 disposed at intervals throughout the height of the integrated post and anchor member affords a convenient means of readily inserting a lading strap 29 through the anchor member at substantially any desired height, as best indicated in Fig. 3.

In Figs. 5 through 8 another form of anchor member is illustrated also as applied to a door post. The anchor member of this form comprises a straight round section extending continuously substantially throughout the height of the post 18. As in the previous form, the anchor member 31 extends vertically and is disposed parallel to the framing post and is secured to the post by means of welding, but does not contain inherent spacing elements separating the main body of the member from the surface of the post. In this arrangement, the round section 31 is disposed in spaced relation to the inner surface of the post member 18 and welded at intervals thereto. The weld metal 32 forming the means of attachment between the anchor member and post also serves to space the member 31 from the post, and as best indicated in Figs. 6 and 8, is built up to a dimension sufficient to space the anchor member the desired amount from the face of the post member in the applied position and thereby provide for the passage of lading straps through openings 33 between the various welds at, for all practical purposes, substantially any desired position throughout the height of the car. The openings 33 are defined by the member 31 and the surface of the post 18 between the adjacent welds 32, and the lading strap 29, as indicated in Figs. 7 and 8, passes around the anchor member 31 and through the openings. Stresses imposed by the lading strap are applied directly to the anchor member, and through the attachment of the weld connections 32, to the post 18.

In Figs. 9, 10 and 11, still another form of anchor member is illustrated as applied to a door post, and comprises a member formed or shaped to provide portions alternately contacting the post for securement thereto and spaced therefrom to provide openings for attachment of the lading straps. The anchor member 36 in this form is disposed vertically, and parallel to the inner edge of the post 18, and extends continuously substantially full height of the post and integrally secured thereto by welding. As best shown in Figs. 10 and 11, the anchor member comprises an initially round section welded at spaced intervals directly to the inner face of the post, with the weld metal 37 disposed upon respectively opposite sides of the section. Each pair of welds 37 upon opposite sides of the anchor member is spaced vertically from each adjacent pair of welds, and between the vertically spaced welds, openings 38 are provided for reception of lading straps secured about the anchor member 36. These openings are formed by offsetting the round section 36 outwardly between the points of attachment to the framing post member by welds 37 and, as shown, this offsetting is accomplished by a flattening of the round section, as at 39, at intervals corresponding to the spacing between welds to provide portions spaced from the post and thus afford the openings 38.

In Fig. 12, lading strap anchors 42 are shown applied to an intermediate side framing post 17 and to the door post 18, and which may be of any of the three types of anchor members described. The inside lining 20 is spaced apart at the post 17, as at 43, to afford access to the anchor member, and is secured to the furring strips 21 mounted at opposite sides of the post member. It will be noted that the lading strap anchor members are disposed within the thickness of the lining 20 and do not project therebeyond into the car, so that the interior side walls are free of obstructions. This is true of all forms of the invention, as clearly shown in Figs. 3, 4, 7, 8 and 11, as well as Fig. 12. None of these arrangements contains any protruding part which might come in contact with the lading contained in the car, but are readily accessible for insertion of a lading strap to secure the load.

In all forms of the invention the anchor members extend substantially full height of the car to provide for the attachment of a lading strap at substantially any height, and while the anchor elements have been described as round sections, it is to be understood that although the round might be preferable, any section suitable for the purpose might be utilized. The anchor members have been disclosed as secured to the inner surface of the framing post members, but it is entirely possible that it may be desirable to secure the anchor members to an edge portion, such as a flange which, if desired, may be formed to provide openings for passage of the lading straps, and while post members of particular cross sectional form have been disclosed, it should be understood that other forms of such members might be used if desired.

The application of the lading strap anchor to the door post at the inner surface is such that the location thereof at this corner serves the purpose of a door post protection member to guard the post against accidental damage arising as a result of some classes of freight striking the corner of the door opening during loading or unloading or in transit, and acts to reinforce or strengthen the post against stresses thus imposed.

By the use of the lading strap anchor arrangement of this invention, lading straps may readily be applied at substantially any desired height and stretched across the car between the opposite side walls to brace the lading in any manner required, or extended across the doorways of the car between door posts to brace or secure the lading, or provide means of ventilating the car with the doors open while protecting the lading against unauthorized access, and also to prevent lading from toppling against the closed doors in transit and thereby causing difficulty in opening the doors at the destination point.

What I claim is:

1. In a railway freight car having a side wall including vertical framing posts, a lading strap anchor arrangement comprising a unitary anchor member consisting of a continuous metal bar disposed in generally parallel relation to one of said posts and extending over a substantial portion of the vertical extent of the post, means including weld metal attachments spacing said member from the post, and openings between said anchor member and the post located between said attachments.

2. In a railway freight car having a side wall including spaced framing posts, a lading strap anchor arrangement comprising unitary anchor members each consisting of a continuous metal bar disposed in generally parallel relation to certain of said posts and extending over a substantial portion of the height of the respective posts, each of said anchor members having means including weld metal attachments at vertically spaced intervals spacing said members from the posts, and openings between said anchor members and posts disposed in alternate relationship to said attachments throughout a substantial portion of the height of the respective anchor members.

3. In a railway freight car having a roof, a floor and a side wall including spaced framing posts, a lading strap anchor arrangement comprising unitary anchor members disposed in generally parallel relation to certain of said posts and extending substantially full height thereof from said floor to said roof, each of said lading strap anchors comprising a continuous metal bar having integrated means including weld metal attachments at vertically spaced intervals spacing said members from the posts, and openings between said anchor members and posts disposed in alternate relationship to said attachments throughout a substantial portion of the height of the respective anchor members.

4. In a railway freight car having a side wall including vertical framing posts, a lading strap anchor arrangement comprising a unitary anchor member disposed in parallel spaced relation to the innermost face of one of said posts substantially throughout the height of the post, means comprising weld metal integrally connecting said members to said face of the post at vertically spaced intervals, and openings between said anchor member and the post disposed in alternate relationship to said weld metal throughout a substantial portion of the height of the anchor member.

5. In a railway freight car having a roof, a floor and side walls spaced apart each including framing posts, a lading strap anchor arrangement including unitary anchor members disposed in parallel relationship to certain of said posts in opposing relation at opposite sides of the car and extending substantially full height thereof from said floor to the roof, each of said lading strap anchors comprising a continuous member having portions in spaced relation to the respective posts, and weld metal integrally connecting said members to the innermost faces of said posts at vertically spaced intervals, said spaced portions providing openings between the respectively associated anchor members and posts disposed in alternate relationship to said weld metal.

6. In a railway freight car having a side wall including framing posts, a lading strap anchor arrangement comprising an integral anchor member disposed in substantially parallel relation to an inwardly disposed face of one of said posts, laterally projecting tab members between said post face and anchor member at vertically spaced intervals, and weld metal securing said anchor member to the face of the post in the areas of said tab members.

7. In a railway freight car having a side wall including framing posts, a lading strap anchor arrangement comprising an integral anchor member disposed in substantially parallel relation to an inwardly disposed face of one of said posts, laterally projecting tabs on said member engaging said post face at vertically spaced intervals, and weld metal integrally securing said tabs to the face of the post.

8. In a railway freight car having a side wall including a door post, a unitary lading strap anchor member extending over a substantial portion of the height of the door post disposed in substantially parallel relation to said post, laterally projecting tabs integral with said member engaging the post at vertically spaced intervals, and weld metal integrally securing said tabs to the posts, said member having lading strap openings between the member and post disposed in alternate relation to said tabs.

9. A freight car side door post having a unitary lading strap anchor member integrated therewith and comprising a continuous metal bar substantially coextensive therewith, weld metal integrally connecting said member with the post at spaced intervals, and openings between the member and post disposed in alternate relation with the weld metal connections.

10. In a railway freight car having a side wall including framing posts, a unitary lading strap anchor member disposed generally parallel to said post and having portions at vertically spaced intervals in engagement with the post, weld metal integrally securing said engaging portions to the post, and portions of said member between said engaging portions being offset to provide openings between the member and said post for the reception of lading straps.

11. In a railway freight car having a side framing post, a unitary lading strap anchor member associated with the post having portions engaging the post at vertically spaced intervals, said member having other portions between said engaging portions spaced from the post to provide openings for reception of lading straps, and weld metal integrally securing said engaging portions to the post.

12. A freight car side framing post having a unitary lading strap anchor member associated therewith of initially round section, said member being disposed in engagement with the post at spaced intervals, said member between said intervals of engagement being flattened to provide openings between the member and post for reception of lading straps, and weld metal integrally securing said engaging portions to the post.

13. A freight car side framing post having a unitary lading strap anchor member comprising a continuous metal bar substantially parallel thereto, weld metal attachments securing said member to the post, and openings between said member and the post disposed between said attachments.

14. In a railway freight car having a side wall including a door post member, a unitary lading strap anchor member disposed in substantially parallel relation to said post member, laterally projecting tabs integral with one of said members and engaging the other at vertically spaced intervals, and weld metal integrally securing said tabs, said member including the tabs having lading strap openings disposed in alternate relation to the tabs.

15. In a railway freight car having a side wall construction including vertical framing posts, a lading strap anchor integrally associated with at least one of said posts and substantially coextensive with the height thereof, said anchor comprising a continuous metal bar arranged generally parallel to an inwardly disposed face of the post, one or more openings between the bar and said face of the post, and weld metal integrating the bar and post.

16. In a railway freight car side wall construction having a door opening and including door framing posts upon opposite sides of the opening, a pair of lading strap anchors integrally associated with the respective posts disposed for reception of one or more lading straps extending therebetween across the door opening, said lading strap anchors each comprising a continuous metal bar extending substantially throughout the height of the normal loading area of said car and arranged generally parallel to the respective posts, one or more lading strap openings between each of the bars and the associated posts, and weld metal integrating the respectively associated bars and posts.

17. In a railway freight car construction having side walls each including a door opening and door framing posts upon opposite sides of the opening, separate lading strap anchors integrally associated with the respective door posts and disposed in relation to the posts for reception of one or more lading straps extending between posts at directly opposite sides of the car or between posts at opposite sides of the door openings upon each side of the car, said lading strap anchors each comprising a continuous metal bar extending vertically and disposed generally parallel to the respective posts, one or more lading strap openings between each of the bars and the associated posts, and weld metal integrating the respectively associated bars and posts.

18. In a railway freight car having a side wall construction including a vertical metal framing post, a lading strap anchor integrally connected with said post and extending along a substantial portion of the vertical extent thereof, said anchor comprising a continuous metal bar arranged generally parallel to an inwardly disposed face of the post and having at least one portion spaced from said face to provide an opening between said portion and face for the reception of a lading strap, and weld metal integrating the bar and post.

19. In a railway freight car having a side wall construction including a vertical metal framing post, a lading strap anchor integrally connected with said post and extending along a substantial portion of the vertical extent thereof, said anchor comprising a continuous metal bar arranged generally parallel to an inwardly disposed face of the post and having a plurality of vertically aligned portions spaced from said face to provide a plurality of openings between said portions and face for the reception of lading straps, said bar being welded to the post along areas of the bar separated from said portions.

ARTHUR A. LOGMANN.
GEORGE C. MEYERS.

REFERENCES CITED

The following references are of record in the file of this patent:

UNITED STATES PATENTS

| Number | Name | Date |
| --- | --- | --- |
| 2,051,381 | Kivlin | Aug. 18, 1936 |
| 2,056,704 | Anderson | Oct. 6, 1936 |
| 2,059,390 | Pagel | Nov. 3, 1936 |
| 2,226,667 | Love | Dec. 31, 1940 |